(12) United States Patent
Trench (10) Patent No.: US 10,159,989 B2
(45) Date of Patent: Dec. 25, 2018

(54) CYCLONE SEPARATOR APPARATUS AND METHODS OF PRODUCTION

(71) Applicant: Weir Minerals Australia Ltd., Artarmon NSW (AU)

(72) Inventor: Michael Trench, Redcliffe (AU)

(73) Assignee: Weir Minerals Australia Ltd. (AU)

( * ) Notice: Subject to any disclaimer, the term of this patent is extended or adjusted under 35 U.S.C. 154(b) by 174 days.

(21) Appl. No.: 14/910,379

(22) PCT Filed: Aug. 8, 2014

(86) PCT No.: PCT/AU2014/050176
§ 371 (c)(1),
(2) Date: Feb. 5, 2016

(87) PCT Pub. No.: WO2015/017902
PCT Pub. Date: Feb. 12, 2015

(65) Prior Publication Data
US 2016/0184837 A1 Jun. 30, 2016

(30) Foreign Application Priority Data
Aug. 9, 2013 (AU) ................................ 2013902999

(51) Int. Cl.
| | |
|---|---|
| *B01D 45/12* | (2006.01) |
| *B04C 5/085* | (2006.01) |
| *B01D 45/16* | (2006.01) |
| *B29C 65/70* | (2006.01) |
| *B04C 5/04* | (2006.01) |

(Continued)

(52) U.S. Cl.
CPC .............. *B04C 5/085* (2013.01); *B01D 45/12* (2013.01); *B01D 45/16* (2013.01); *B29C 65/70* (2013.01); *A47L 9/1608* (2013.01); *B04C 5/04* (2013.01); *B04C 5/13* (2013.01); *B29K 2063/00* (2013.01);

(Continued)

(58) Field of Classification Search
CPC .. B04C 5/085; B04C 5/04; B04C 5/13; B29C 65/70; B29K 2509/02; B29K 2105/16; B29K 2063/00; B01D 45/16; B01D 45/12; A47L 9/1608
See application file for complete search history.

(56) References Cited

U.S. PATENT DOCUMENTS 3,087,645 A * 4/1963 Eddy ...................... B04C 5/081
 209/727
3,243,043 A * 3/1966 Lee ........................... B04C 5/14
 175/66

(Continued)

FOREIGN PATENT DOCUMENTS

| CN | 1651150 A | 8/2005 |
|---|---|---|
| CN | 202199437 U | 4/2012 |

(Continued)

*Primary Examiner* — Dung H Bui
(74) *Attorney, Agent, or Firm* — Morriss O'Bryant Compagni (57) ABSTRACT

There is provided a method of forming a hydrocyclone body including assembling sintered alumina blocks (27) against a form (37), holding the blocks (27) in place with tape (40), locating a hydrocyclone housing over the blocks (27), filling a space between them with settable epoxy/ceramic composite to secure the blocks (27) to the casing, and removing the form (37), resulting in a substantially continuous, wear resistant surface.

12 Claims, 6 Drawing Sheets

(51) Int. Cl.
*B04C 5/13* (2006.01)
*A47L 9/16* (2006.01)
*B29K 63/00* (2006.01)
*B29K 105/16* (2006.01)
*B29K 509/02* (2006.01)

(52) U.S. Cl.
CPC ...... *B29K 2105/16* (2013.01); *B29K 2509/02* (2013.01)

(56) References Cited

U.S. PATENT DOCUMENTS

| | | | | |
|---|---|---|---|---|
| 3,273,320 | A * | 9/1966 | Lawrence | B04C 5/081 |
| | | | | 55/434.1 |
| 3,327,456 | A * | 6/1967 | Guber, Jr. | B04C 5/13 |
| | | | | 165/101 |
| 3,331,193 | A * | 7/1967 | Woodruff | B04C 5/14 |
| | | | | 209/731 |
| 3,902,601 | A * | 9/1975 | Townley | B04C 5/085 |
| | | | | 138/39 |
| 4,004,898 | A * | 1/1977 | Kalen | B04C 5/20 |
| | | | | 55/434.1 |
| 4,317,716 | A * | 3/1982 | Liller | B03B 9/005 |
| | | | | 209/484 |
| 4,391,664 | A | 7/1983 | Kramer | |
| 4,539,105 | A * | 9/1985 | Metcalf | B04C 5/08 |
| | | | | 156/84 |
| 4,601,867 | A * | 7/1986 | Martell | B21D 37/20 |
| | | | | 264/225 |
| 4,623,458 | A * | 11/1986 | Hakola | B01D 45/12 |
| | | | | 209/139.2 |
| 4,746,337 | A * | 5/1988 | Magol | B04C 5/08 |
| | | | | 122/6 A |
| 4,944,250 | A * | 7/1990 | Seshamani | B04C 5/08 |
| | | | | 122/20 B |
| 4,961,761 | A * | 10/1990 | Johnson | B04C 5/085 |
| | | | | 55/434.1 |
| 5,116,394 | A * | 5/1992 | Garkawe | B01D 45/12 |
| | | | | 55/434.4 |
| 5,244,958 | A * | 9/1993 | Goodman | C08K 3/346 |
| | | | | 174/110 AR |
| 5,441,081 | A | 8/1995 | Maury | |
| 5,705,250 | A * | 1/1998 | Hudson, Jr. | B65D 90/045 |
| | | | | 415/170.1 |
| 6,214,075 | B1 * | 4/2001 | Filges | B04C 5/13 |
| | | | | 138/107 |
| 6,267,803 | B1 * | 7/2001 | Escobar | B01D 45/16 |
| | | | | 55/337 |
| 6,355,178 | B1 * | 3/2002 | Couture | B01D 45/16 |
| | | | | 210/223 |
| 6,596,170 | B2 * | 7/2003 | Tuszko | B04C 5/081 |
| | | | | 209/715 |
| 6,686,752 | B1 | 2/2004 | Heumann | |
| 6,962,434 | B2 | 11/2005 | Martin et al. | |
| 7,293,657 | B1 * | 11/2007 | Kelton | B03B 5/34 |
| | | | | 209/715 |
| 7,655,061 | B2 * | 2/2010 | Parkinson | B04C 5/08 |
| | | | | 210/512.2 |
| 9,022,231 | B1 * | 5/2015 | Ford | B04C 9/00 |
| | | | | 210/512.1 |
| 9,744,490 | B1 * | 8/2017 | Novosselov | B01D 45/16 |
| 2001/0002009 | A1 * | 5/2001 | Gil | B04C 5/085 |
| | | | | 210/512.1 |
| 2001/0052223 | A1 * | 12/2001 | Filges | B04C 5/085 |
| | | | | 55/434.1 |
| 2003/0197297 | A1 * | 10/2003 | Berk | B29C 35/0288 |
| | | | | 264/40.6 |
| 2004/0020026 | A1 | 2/2004 | Schandenberg et al. | |
| 2004/0055286 | A1 * | 3/2004 | Kinoshita | B01D 45/16 |
| | | | | 60/297 |
| 2005/0016904 | A1 * | 1/2005 | Knox-Holmes | B04C 5/085 |
| | | | | 209/590 |
| 2005/0065013 | A1 * | 3/2005 | Rosenflanz | C03B 19/06 |
| | | | | 501/41 |
| 2005/0279058 | A1 * | 12/2005 | Stewart | B01D 45/16 |
| | | | | 55/347 |
| 2006/0166803 | A1 * | 7/2006 | Schulz | B04B 1/10 |
| | | | | 494/56 |
| 2008/0250765 | A1 * | 10/2008 | Lane | B01D 45/06 |
| | | | | 55/495 |
| 2009/0235823 | A1 * | 9/2009 | Tan | B01D 45/12 |
| | | | | 96/251 |
| 2009/0282858 | A1 * | 11/2009 | Demetri | B01D 45/12 |
| | | | | 62/401 |
| 2009/0288560 | A1 * | 11/2009 | Ruppel | F01M 13/04 |
| | | | | 96/408 |
| 2010/0180557 | A1 * | 7/2010 | Kaidalov | B01J 8/0055 |
| | | | | 55/345 |
| 2011/0271836 | A1 * | 11/2011 | Phillips | B01D 45/12 |
| | | | | 95/271 |
| 2012/0174547 | A1 * | 7/2012 | Tornblom | B01D 45/14 |
| | | | | 55/461 |
| 2012/0216946 | A1 * | 8/2012 | Hondo | H05K 3/205 |
| | | | | 156/182 |
| 2013/0134108 | A1 * | 5/2013 | Howard | B01D 17/0217 |
| | | | | 210/788 |
| 2013/0269301 | A1 * | 10/2013 | Stroeder | B01J 8/0055 |
| | | | | 55/434.2 |
| 2013/0284509 | A1 * | 10/2013 | Murayama | H01R 9/095 |
| | | | | 174/267 |
| 2016/0184837 | A1 * | 6/2016 | Trench | B04C 5/085 |
| | | | | 55/461 |
| 2016/0214119 | A1 * | 7/2016 | Lankinen | B65D 85/672 |
| 2017/0008763 | A1 * | 1/2017 | Karng | B01D 53/86 |

FOREIGN PATENT DOCUMENTS

| | | |
|---|---|---|
| CN | 202909835 U | 5/2013 |
| DE | 4308272 C1 | 6/1994 |
| EP | 0145324 A2 | 6/1985 |
| SU | 1223998 A1 | 4/1986 |
| WO | 0070326 A1 | 11/2000 |
| WO | 2006072123 A1 | 7/2006 |
| WO | 2007101319 A1 | 9/2007 |
| WO | 2011137539 A1 | 11/2011 |
| WO | 2012116416 A1 | 9/2012 |

\* cited by examiner

CYCLONE SEPARATOR APPARATUS AND METHODS OF PRODUCTION

TECHNICAL FIELD

This disclosure relates to a cyclone separator apparatus and methods for its production. It has particular application to a cyclone separator lining apparatus and a method of producing a wear resistant cyclone separator for minerals processing, and for illustrative purposes will be described with reference to this application. However we envisage that the apparatus disclosed may find use in other applications, such as producing a wear resistant cyclone separator for refractory materials generally.

BACKGROUND ART

Cyclonic separation is a method of removing particulates from an air, gas or liquid stream, without the use of filters, through vortex separation. Rotational effects and gravity are used to separate mixtures of solids and fluids.

A high speed rotating flow of heterogeneous material is established within a vertical, inverted, frusto-conical housing. The material flows in a helical pattern, beginning at the top (wide end) of the cyclone and ending at the bottom (narrow) end before exiting the cyclone in a straight stream through the centre of the cyclone and out the top. Larger and denser particles in the rotating stream have too much inertia to follow the tight curve of the stream, and strike the outside wall, then falling to the bottom of the cyclone where they are removed in an underflow.

Ceramic lined cyclones are wear resistant separators used commonly in the art of minerals processing. Typically a steel, truncated-conical cyclone body has outward-directed, radial flanged ends configured to accept inlet and outlet assemblies, and an inner conical wall surface. Tapered blocks of sintered alumina or a like ceramic are progressively glued on the inner conical wall surface to build up a wear-resistant surface.

There is an inherent limitation of the size of monolithic liner blocks that can be isostatically pressed. That is, isostatic presses can only produce fairly small ceramic liner block portions which in turn means that multiple liner portions (commonly and henceforth referred to as "tiles") are required to line a cyclone. To date the conventional method of producing cyclone components with these tiles is to adhere them to the internal steel surface of the cyclone shell. Given differential shrinkage between tiles, the amount of glue applied to each tile as well as the applicator's ability to force each tile into the correct position, the working surface of the cyclone (inner surface of the tile) is inevitably uneven. In use with slurries or other fluids, this can lead to biased and more rapid wear of the cyclone interior tiles, as well as loss of cyclone efficiency.

SUMMARY OF THE DISCLOSURE

In a first aspect, embodiments are disclosed of a method of forming a wear resistant minerals processing body including the steps of:

assembling wear resistant elements to form a substantially continuous wear resistant surface against an outer surface of a form;

locating a casing over the wear resistant elements with a space therebetween;

filling the space with a settable adhesive material;

allowing the settable adhesive material to set in order to secure the wear resistant elements relative to the casing; and removing the form.

In certain embodiments, the wear resistant minerals processing body may be a cyclone separator body or lower cone and spigot assembly. Alternatively, the processing body may be another static or rotating part, including but not limited to rotating drums and tumblers, lined pipe portions subject to accelerated wear and the like.

In certain embodiments, the wear resistant elements may comprise any suitable material of hardness, and other physical and/or chemical properties fit for the chosen purpose. Such materials may be limited in size due to the processes for their formation, requiring use in assemblies of wear resistant elements. Alternatively, the parts may be chosen to allow refurbishment by partial replacement.

In certain embodiments, the wear resistant materials may comprise isostatically hot pressed sintered materials including but not limited to alumina, silica, clay minerals, carbides or the like. The wear resistant material may be a fired or cast material. The wear resistant materials may be used as-formed or may be machined or ground in post-forming.

In certain embodiments, the wear resistant elements may be selected from specific shapes selected to fit in close abutment to form the substantially continuous surface. For example, for a minerals processing cyclone separator body, the wear resistant elements may comprise specifically shaped elements adapted to form in assembly a frusto-conical wear surface with minimal gaps between the elements. Thus the surface formed by the wear elements is continuous in being both substantially smooth and substantially void free.

In certain embodiments, the wear resistant elements may be of different radial thickness. In the case of a cyclone, the lining may wear more aggressively in the lower (narrower) regions of the cyclone. It may therefore be beneficial to be able to use thicker linings in this region of the cyclone. As the wear surface is laid up on a form, and the space is selectable, the method may readily accommodate different lining thickness. This offers cost and weight savings by avoiding having a thick lining throughout.

The wear resistant elements may be retained in position on the form by any suitable means. For example, individual rows of wear elements may be retained by tie wire, adhesive tape or the like. The adhesive tape may be adapted to accommodate a tapering form for a hydrocyclone liner by any suitable means such as lateral elastic or plastic deformation. For example, the tape may comprise unidirectional fibre-reinforced tape, cross hatch reinforced tape or the like.

The form plays no part in the end use and as a consequence may be of any material adapted to support the wear resistant elements in position for the purposes of the method. In certain embodiments in the case of a cyclone separator body assembly or lower cone and spigot assembly, the form may have a substantially truncated-conical outer surface against which the wear resistant elements may be assembled. The form may be made of sheet metal.

In certain embodiments, the casing may be formed of sheet or plate metal, be cast of metal, polyurethanes or laminated in reinforced polymer, as the duty requires. In the case of cyclone separator assemblies the casing is usually of steel. The casing may be provided with end flanges; a cyclone separator body assembly may be provided with flanges at both ends in order to be mounted to inlet and lower cone and spigot equipment respectively.

In certain embodiments, the space may be of any cross sectional dimension subject to permitting infiltration of the settable material.

In certain embodiments, the settable material may in certain applications be a resilient material such as polyurethane or rubber material. The material may in use penetrate the fine cracks between elements to prevent ingress of the mineral materials being processed. The materials resilience offers improved impact absorption properties to the ceramic tile lining.

In the alternative, the settable material may comprise a mineral filled resin bound material. The mineral may comprise ceramic beads. The binder may comprise epoxy resin. Such materials maybe selected to deform minimally under the expected loads while offering a high degree of abrasion resistance. This resistance to abrasive wear in conjunction with the wear indicating mechanism outlined hereunder will allow the settable material to act as a secondary wear barrier once the primary tile lining has worn through thus facilitating planned maintenance or replacement.

In the case of mineral filled resin bound settable adhesive materials forming a secondary wear resistant layer, the cross sectional dimension of the space is at least 5 mm, and preferably from 5 to about 25 mm.

The lining material wears, irrespective of its wear resistance. However, unlike sacrificial housings, composite minerals processing elements having a generally metallic outer housing lined with a wear resistant, usually ceramic material are difficult to remote sense for wear by penetrating radiation or ultrasound. This may be due at least in part to the dispersive effect of the respective material boundaries. This limitation means that ceramic wear linings can only be measured by mechanical or visual means. This requires extended downtime given the need to disassemble the cyclone prior to inspection and measurement.

In order to avoid unnecessary down time, the monitoring or testing may be done by remote sensing or other means of measurement from the outside of the closed equipment. In certain embodiments, there may be included monitoring means in the space between the wear resistant elements and the body member. In certain embodiments, the monitoring means may include one or more transducers, connected either singly or in arrays to an interface external of the body member. The transducer(s) may directly measure the thickness of a wear resistant element or elements it its location.

Alternatively, in certain embodiments the monitoring means may comprise one or more conductors each forming a continuity tester having an interface external of the body member, whereby wear through the wear resistant elements renders the conductor electrically discontinuous as monitored at the interface.

In a second aspect, embodiments are disclosed of a method of forming a wear indicating minerals processing body including the steps of:

providing a substantially continuous wear resistant liner;
locating one or more monitoring elements on an outer surface of the liner;
locating a casing over the wear resistant liner with a space therebetween;
providing a lead out from each monitoring element to an interface external of the casing;
filling the space with a settable adhesive material; and
allowing the settable adhesive material to set.

The wear resistant liner may be provided by assembling wear resistant elements to form the liner, as described above. In this context and hereinafter, the "outer surface" of the wear resistant liner is the surface opposed to the inner surface. The inner surface is the surface exposed to a high wear environment. Wear through to the outer surface indicates a test failure state of the primary liner per se.

In certain embodiments, the settable adhesive material may comprise a secondary wear resistant layer to provide time-to-shutdown flexibility on determination of a worn condition of the wear resistant liner at the interface. An example of a secondary wear material is a mineral filled resin bound settable composition, such as a ceramic bead filled epoxy resin bound composition.

In certain embodiments, the monitoring elements may include one or more transducers, connected either singly or in arrays to an interface external of the body member. The transducer may directly measure the thickness of a wear resistant element or elements it its location. Alternatively, in certain embodiments, the monitoring elements may comprise one or more conductors each forming a continuity tester, whereby wear through the wear resistant elements renders the conductor electrically discontinuous as monitored at the interface.

The conductor or conductors may be insulated by an abrasively frangible insulative material, or the conductor insulated from itself at junctions, to permit laying up in a grid pattern on the wear resistant liner. Insulation may be particularly desirable to prevent leakage of current through conductivity of a mineral filler of the resin bound settable composition. In certain embodiments, the conductor or conductors may be spirally wound about the outer surface where there are no crossovers. Alternatively, in certain embodiments the conductor or conductors may be arranged in a zigzag, sinuous or other "up and back" pattern selected to provide practical wear-indicating coverage for the primary wear liner.

The conductor or conductors may comprise an insulated wire conductor. The insulated wire conductor may comprise a multifilament cable for flexibility.

In the case of a cyclone separator body, in certain embodiments a generally axial zigzag or sinuous pattern may have a spacing of the apices of the conductor at the frusto-conical base being larger than the spacing toward the narrower truncation. Where the apex spacing at the base is deemed to be too large, such as to allow wear to be at risk of not being signalled, the axial extent may be monitored by two or more zigzag or sinuous conductors. In certain embodiments, where two or more zigzag or sinuous conductors are used, these may be axially interleaved. The apices of a zig-zag pattern may be radiused to avoid cold-working the conductive wire to brittleness.

In certain embodiments, the lead-outs may comprise insulated wires passing through apertures through a side wall portion of the body member. Alternatively, the lead-outs may pass our through an end portion of the minerals processing body.

The interface may comprise electrical terminals or slip rings. Alternatively, in certain embodiments the interface may comprise a monitoring device connected to the monitoring element, including but not limited to an RFID device.

In a third aspect, embodiments are disclosed of a method of forming a wear indicating cyclone separator component including the steps of:

providing a substantially truncated-conical wear resistant cyclone component liner;
locating one or more wire conductors on an outer surface of the liner;
locating a cyclone separator casing over the cyclone liner, an inner surface of the casing and the cyclone liner defining a space therebetween;

providing a plurality of lead-outs from each conductor to external of the cyclone separator casing;

filling the space with a settable adhesive material to secure the cyclone component liner relative to the cyclone separator casing; and allowing the settable adhesive material to set.

The cyclone separator component may be selected from cyclone separator body assemblies and cyclone separator lower cone and spigot assemblies.

In a fourth aspect, embodiments are disclosed of a wear resistant mineral processing body including:

a wear resistant, substantially smooth inner surface formed of a plurality of substantially abutting wear resistant elements; and a casing secured over and supporting the wear resistant elements by a settable adhesive material filling a space between the casing and the wear resistant elements in assembly.

In a fifth aspect, embodiments are disclosed of a wear indicating cyclone separator component including:

a substantially truncated-conical wear resistant cyclone liner formed of a plurality of wear resistant elements;

one or more wire conductors located on an outer surface of the liner; and a cyclone separator component casing having a plurality of lead-outs from each the conductor and located over and secured to the cyclone liner by a settable adhesive material filling a space therebetween.

In each of the aforementioned further aspects, the settable adhesive material may comprise a secondary wear resistant layer.

In a sixth aspect, embodiments are disclosed of a wear resistant mineral processing body formed by a method of the aforementioned first aspect.

In a seventh aspect, embodiments are disclosed of a wear indicating cyclone separator formed by a method of one of the aforementioned second or third aspects.

Other aspects, features, and advantages will become apparent from the following detailed description when taken in conjunction with the accompanying drawings, which are a part of this disclosure and which illustrate, by way of example, principles of any inventions disclosed.

DESCRIPTION OF THE FIGURES

The accompanying drawings facilitate an understanding of the various embodiments.

DETAILED DESCRIPTION

Figure 1:
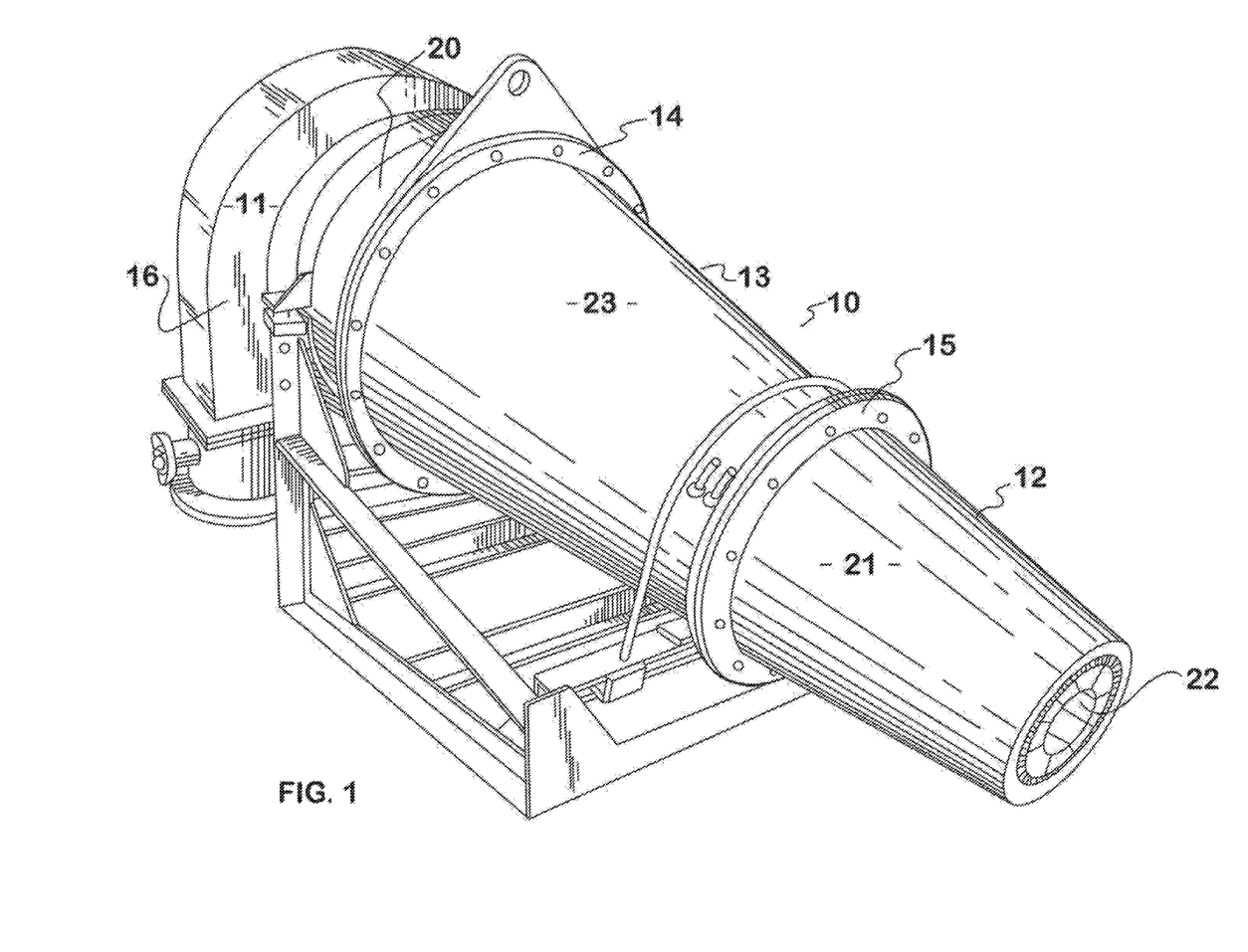
FIG. 1 is a perspective view of a crated cyclone separator assembly.

Referring to FIG. 1, there is provided a cyclone assembly 10 consisting of an inlet assembly 11 and a lower cone and spigot assembly 12, separated by a cyclone body assembly 13, the latter secured to each of the inlet assembly 11 and the lower cone and spigot assembly 12 by respective flange abutments 14, 15. The inlet assembly has a tangential or cycloidal inlet 16 to, and an in use upper axial outflow from a ceramic-lined inlet portion 20.

The lower cone and spigot assembly 12 includes a ceramic lined, lower cone 21 defining a separation zone in use for relatively large and/or dense particles of a feed slurry material during a cyclone separation operation, and an underflow outlet spigot 22 via which the separated particles pass in use during discharge.

Figure 2:
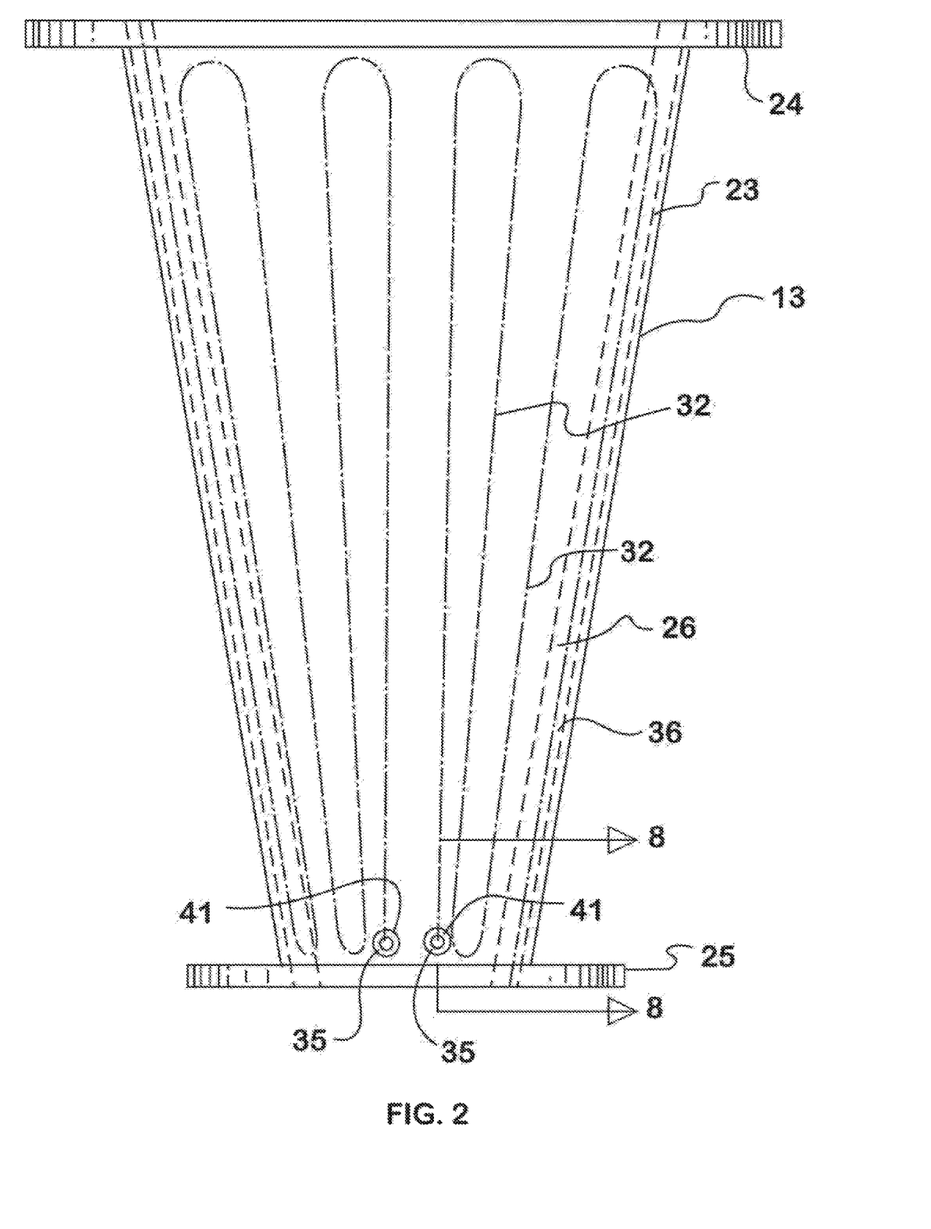
FIG. 2 is a portion of a cyclone assembly, in accordance with one embodiment of the present disclosure.
Figure 6:
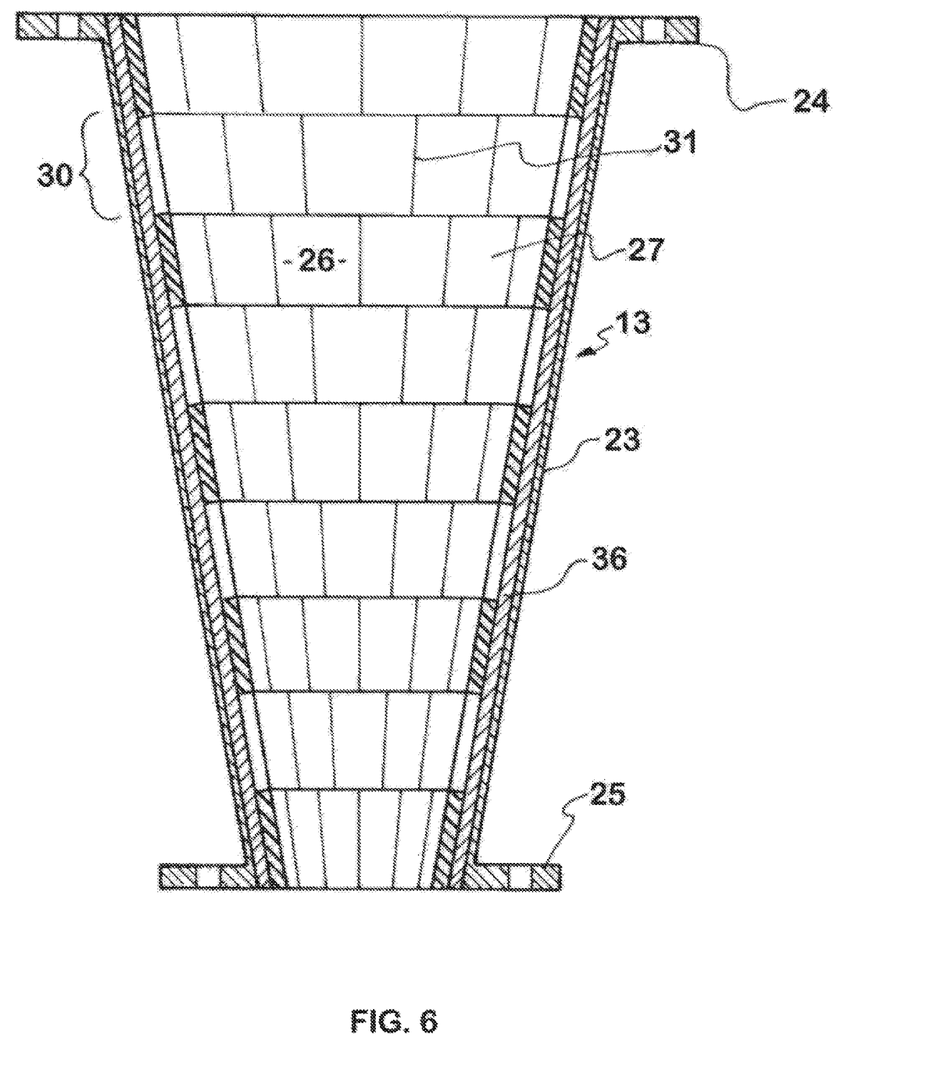
FIG. 6 is a half-sectional view of a wear resistant cyclone body in accordance with an embodiment of the present disclosure.

As shown in FIGS. 2 and 6, the cyclone body assembly 13 includes a steel outer frusto-conical housing 23 having an in use upper inlet flange 24 and a lower underflow flange 25. A wear resistant liner assembly 26 comprising closely abutting, isostatically pressed, sintered alumina blocks 27 of both axially tapered and circumferentially curved form, is arranged in serried circumferential rows 30, the joins 31 between adjacent blocks 27 in a row being offset from the joins 31 in the rows axially adjacent.

Figure 8:
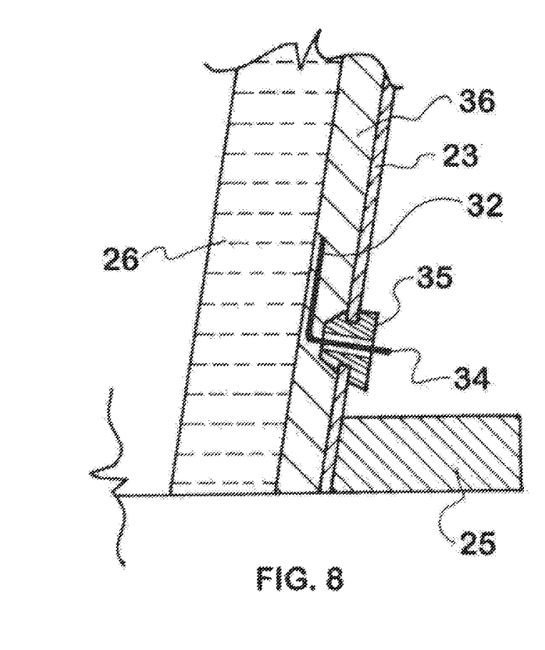
FIG. 8 is a conductor lead-in detail of the cyclone body of FIG. 4.

As can be seen in FIG. 2, and in the detail shown in FIG. 8, a conductive wire insulated by LINATEX® rubber 32 forms an axially aligned zigzag pattern with radiused apices on the outer surface of the liner assembly 26. The wire insulated by LINATEX® rubber is 5-stranded, multifilament wire wherein each filament comprises 0.38 mm brass coated crimped steel, the strands being twisted to form a bundle within the insulation cover. The conductive wire 32 is terminated by lead-outs 34 passing through the wall of the housing 23 via ceramic insulators 35. The liner assembly 26 is spaced from the housing 23 by a 5-25 mm deep space 36. The liner assembly 26, conductive wire 32, lead-outs 34 and insulators 35 are all encapsulated by and secured to the interior wall of the frusto-conical housing 23 by mineral filled epoxy resin encapsulant adhesive filler occupying the space 36. LINATEX® is a registered trademark of Linatex Limited, a Weir Group PLC affiliate company.

Figure 3:
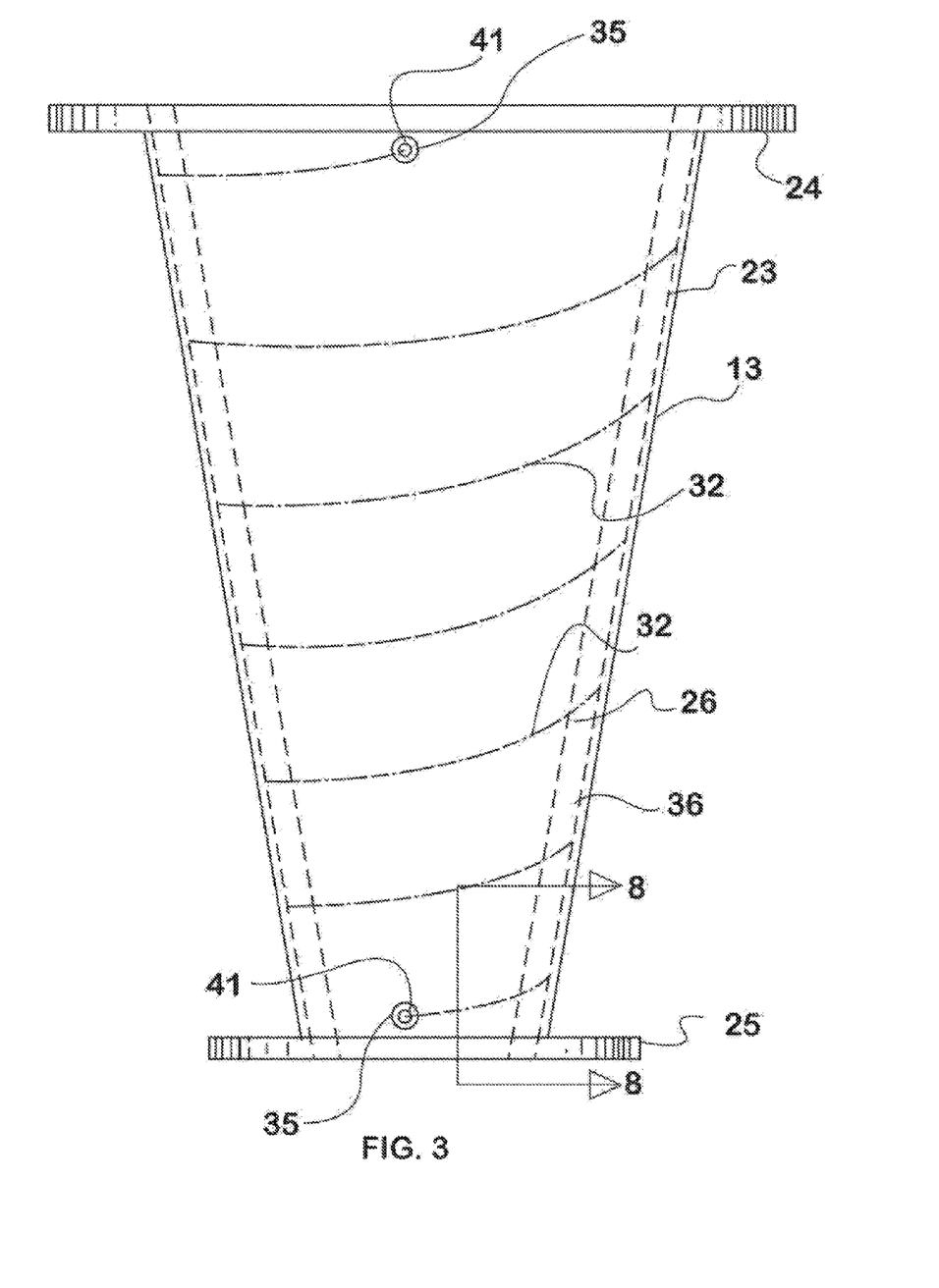
FIG. 3 is a portion of a cyclone assembly, in accordance with a another embodiment of the present disclosure.
Figure 4:
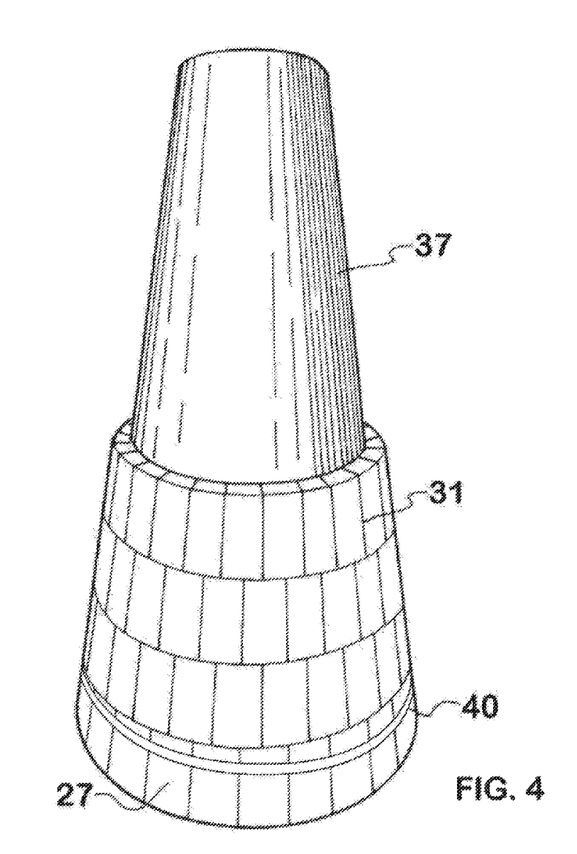
FIG. 4 is a perspective view of a partially-assembled wear resistant lining on a form, in accordance with one embodiment of the apparatus and of one embodiment of the method of the present disclosure.
Figure 5:
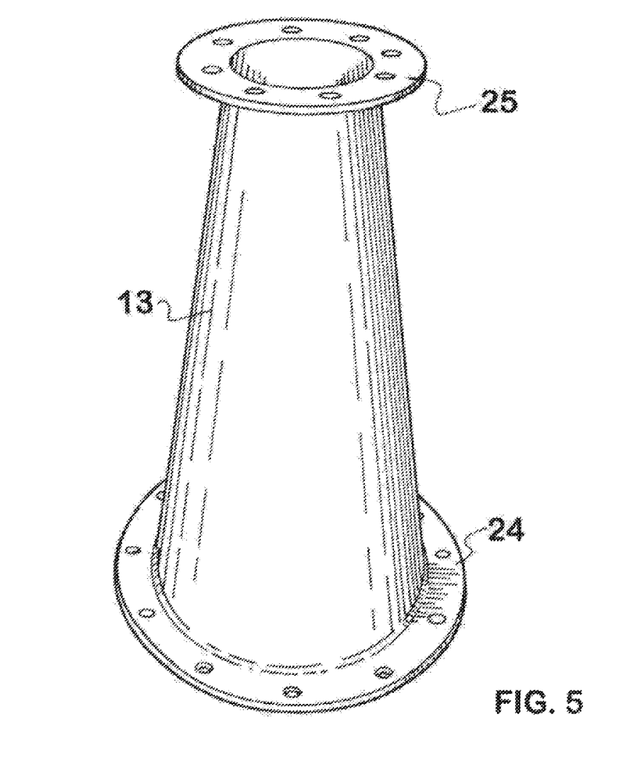
FIG. 5 is a cyclone body outer casing suitable for use in conjunction with the liner of FIG. 6.

As can be seen in the alternative embodiment of FIG. 3, the conductive wire 32 may be laid in a spiral on the outer surface of the liner assembly 26. In this embodiment the apertures 41 are located adjacent the respective flanges 24, 25.

Figure 7:
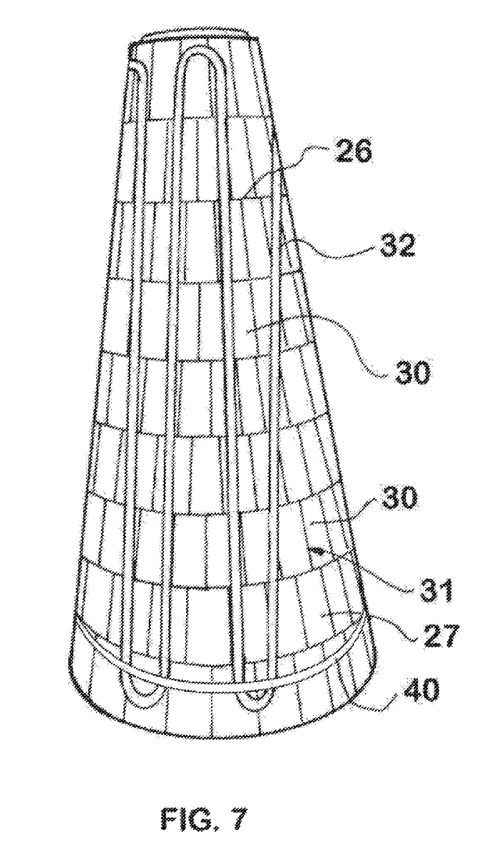
FIG. 7 is a perspective view of an assembled wear resistant liner assembly in accordance with an embodiment of the present disclosure, which suitable for use with the cyclone body of FIG. 4.

To illustrate the method of the example, reference can be made to FIGS. 3 and 7. The wear resistant liner assembly 26 is assembled from the isostatically pressed sintered alumina blocks 27 in the circumferential rows 30 by laying up the blocks 27 about a frusto-conical form, or mandrel 37. The layup is secured against collapse by strategic circumferential tie-wires or tape bands 40.

After layup is complete, the conductive wire 32 is then laid up in either an axially aligned zigzag pattern (FIG. 2) or a circumferential spiral pattern (FIG. 3) on the outer surface of the liner assembly 26, and retained by occasional restraints (not shown). The lead-outs 34 are left long at this time.

The frusto-conical housing 23 has apertures 41 to which are fitted the ceramic insulators 35. Each long lead-out 34 is passed through the housing 23 and out through a respective insulator 35. During assembly of the final product, the lead outs 34 are continuously eased through the insulators 35 while the housing 23 is lowered over the liner assembly 26.

When the housing 23 is located completely over the liner 26, a ceramic-bead filled epoxy resin encapsulant adhesive filler is then injected into the 5-25 mm space 36, in order to encapsulate the inner assembly 26, the conductive wire 32, the lead-outs 34 and the insulators 35 and to bond the assembly thereof to the housing 23.

After curing, the long lead-outs 34 may be trimmed and terminated, and the cyclone body assembly 13 assembled by mounting its upper inlet flange 24 and its lower underflow flange 25 to the inlet assembly 11 and to the lower cone and spigot assembly 12, respectively.

The lower cone and spigot assembly 12 is formed in substantially the same way as described for the body assembly 13 of the cyclone.

In use, the encapsulant adhesive filler comprises a secondary wear layer. The lead-outs 34 each form a terminal between which a continuity tester (in this case, a multimeter) may be connected. In the event that a discontinuity of the conductive wire 32 is detected, a worn state of the primary liner assembly 26 is inferred. Thereafter the operator may program a shut-down in an orderly fashion rather than in response to catastrophic failure. The secondary wear liner thus provides a management interval between an indication of failure and shut-down and replacement of the worn assembly.

Apparatus and methods in accordance with the foregoing embodiment can reduce the labour required to manufacture cyclone components. The internal surface of cyclone component is relatively smoother than the prior art examples since the inner surface is prepared by being laid up on a smooth form or mandrel. This reduces the turbulence generated by the interaction of the outlet surface of the layer of tiles and the circulating fluid within the cyclone chamber.

Labour can also be reduced as each individual tile does not have to be glued into its precise position, nor is it awkward for an operator to constantly need to reposition in order to place some tiles in specific locations down the inside wall of a cyclone housing, as is the known prior art methodology. In addition, the filled epoxy layer may accommodate any 'out-of-round' shape of the fabricated housing while maintaining a regular conical substantially smooth wear surface.

Using a multimeter (or alternative) across the two exposed ends of the conductive wire, the "circuit" can easily and rapidly be tested for integrity without disassembly or interruption of the operating process. Excess wear (which is evident if the "circuit" has been broken) warns the operator that the cyclone is operating with access to the secondary wear liner formed by the ceramic-bead filled epoxy, and that scheduled maintenance or replacement of the part is required. Catastrophic failure is therefore avoided with planned maintenance becoming predictable.

Forming cyclone linings against a form can also accommodate the use of wear elements of varying thickness. This is a very useful alternative given that a vertically oriented cyclone typically wears more aggressively at the in use lower regions of the cyclone. It may therefore be beneficial to be able to use thicker linings in this region of the cyclone. This ability to easily accommodate different lining thickness offers cost and weight savings, which is something not economically achievable using the traditional "tile laying method" on the inside of the housing.

In refurbishment, heating of the housing allows it to expand differentially from the epoxy/liner composite, allowing the word composite to drop out of the taper.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, for example, aspects of one embodiment may be combined with aspects of another embodiment to realize yet other embodiments. Further, each independent feature or component of any given assembly may constitute an additional embodiment.

The invention claimed is:

1. A method of forming a wear resistant minerals processing body including the steps of:
    assembling wear resistant elements to form a substantially continuous wear resistant surface against an outer surface of a form;
    locating a casing over the wear resistant elements with a space therebetween;
    filling the space with a settable adhesive material;
    allowing the settable adhesive material to set in order to secure the wear resistant elements relative to the casing; and
    removing the form wherein the wear resistant minerals processing body is selected from a cyclone separator body assembly and a cyclone separator lower cone and spigot assembly.

2. The method according to claim 1, wherein the wear resistant elements comprise isostatically pressed sintered ceramic material.

3. The method according to claim 2, wherein the ceramic material is alumina.

4. The method according to claim 1, wherein the wear resistant elements comprise specifically shaped elements adapted to form, in close abutment, a frusto-conical surface comprising said substantially continuous wear resistant surface.

5. The method according to claim 1, wherein the form comprises a substantially truncated-conical outer surface against which the wear resistant elements are assembled.

6. The method according to claim 1, wherein the casing is of steel and provided with one or more end flanges.

7. The method according to claim 1, wherein the settable adhesive material is selected from a resilient material and a thermoset resin material.

8. The method according to claim 7, wherein the settable adhesive material is selected from mineral-filled epoxy grouting materials.

9. The method according to claim 8, wherein the mineral-filled epoxy grouting materials comprise ceramic beads.

10. The method according to claim 1, including providing monitoring means in the space between the wear resistant elements and the casing.

11. The method according to claim 10, wherein the monitoring means includes one or more transducers connected to an interface external of the casing.

12. The method according to claim 10, wherein the monitoring means comprises one or more conductors each forming a continuity testing circuit element having an interface external of the casing.

* * * * *